Oct. 31, 1950     H. I. SCHLESINGER ET AL     2,528,454
COATING PROCESS
Filed Nov. 7, 1946
FIG.1.
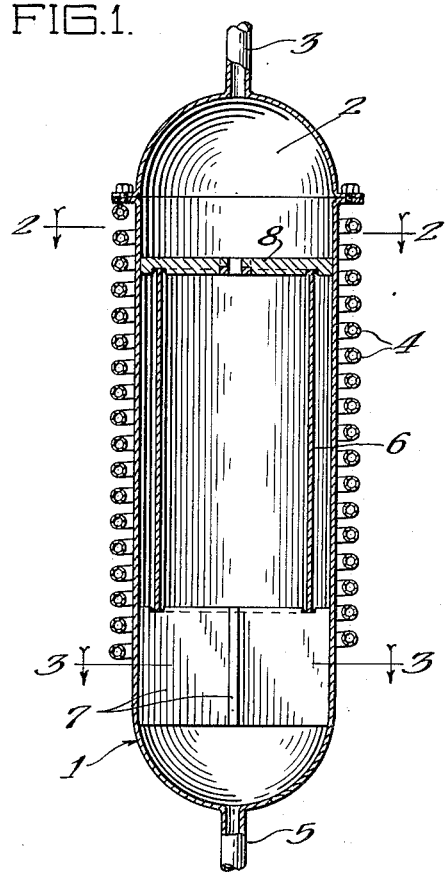
FIG.2.
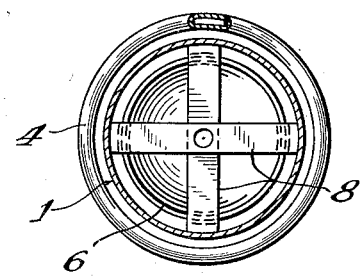
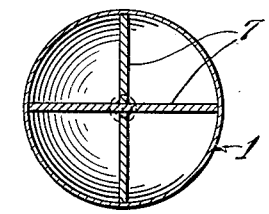
FIG.3.
INVENTORS:
Hermann I. Schlesinger
George W. Schaeffer
By: Roland A. Anderson
Attorney Patented Oct. 31, 1950

2,528,454

UNITED STATES PATENT OFFICE 2,528,454

COATING PROCESS

Hermann I. Schlesinger and George W. Schaeffer, Chicago, Ill., assignors to the United States of America as represented by the United States Atomic Energy Commission Application November 7, 1946, Serial No. 708,446

5 Claims. (Cl. 18—58.4)

This invention relates to the art of depositing substances by thermal decomposition of gases, and more particularly the present invention relates to a novel boron or boron-containing deposit, and to a novel method or process for producing such a deposit by the thermal decomposition of volatile compounds of boron and hydrogen.

It is known that a boride or boron coating may be imparted to certain metals by heating the metal in contact with the boron hydride $B_4H_{10}$ at a temperature well above 700° C. Such coatings are either borides of the metal base or crystalline boron. Crystalline boron coatings have been found to be objectionable because of their poor adherence and also because they are not suitably compact. This is particularly true where relatively thick coatings or layers of boron are deposited. The properties of deposits or coatings of essentially pure boron are determined by the nature of the boron, i. e., whether it is amorphous or crystalline. The more crystalline the deposit, the lower is its temperature coefficient of electrical resistance. This feature is quite important in the use of boron deposits for the preparation of resistors, flow meters, pressure gauges, neutron thermometers, etc., where the temperature coefficient of electrical resistance is the determining property in the use of the deposit.

In accordance with the present invention, it has been found that boron may be deposited in the amorphous state and as a compact essentially non-porous deposit by heating a metal or other base in an atmosphere of a gaseous boron hydride at a temperature sufficiently high to decompose the boron hydride, usually above about 300° C. but below about 500° C. Coated articles of good chemical resistance may be prepared in this manner. Moreover, integral substantially non-porous articles of boron may be prepared by building up thick deposits and separating the form upon which they have been deposited from the boron deposit. If desired, a deposit of amorphous boron may be formed on an article, composed of a metal or other element capable of forming a boride, by deposition at about 300° C. to 500° C.; the temperature of the article is then raised sufficiently above 500° C. to enable the subphase to react with the boron to form a boride.

The invention may be conducted in an especially effective manner using diborane, but it is to be understood that other volatile compounds of boron and hydrogen may also be used with good results. Gaseous compounds of boron and hydrogen which may be successfully employed are dihydro tetraborane ($B_4H_{10}$), pentaborane ($B_5H_{11}$) decaborane ($B_{10}H_{14}$), hexaborane ($B_6H_{10}$), the compound $B_5H_9$, etc.

According to the invention, boron is deposited on a surface of an article formed of material having a relatively high melting temperature, by heating the article to be coated in a static atmosphere of a volatile boron hydride, such as diborane or by heating the article while flowing a boron hydride thereover. The article is preferably maintained within a temperature range of from 300° to 500° C. If the temperature is too low, the deposit is likely to be contaminated with solid hydrides of boron. If the temperature is too high, several secondary changes may occur: the amorphous deposit tends to become crystalline; the boron tends to diffuse from the surface into the subphase when the subphase is composed of a material capable of forming a boride; and borides of the subphase are formed. In this connection, it has been discovered that boron will react with all but the so-called refractory metals, such as tungsten, molybdenum, and tantalum, at temperatures above 700° C. and with many metals such as iron, aluminum and copper at temperatures above 500° C. Consequently, in order to produce a deposit of pure amorphous boron in which no boride is formed, it is necessary to use a low temperature method of deposition wherein the subphase is maintained at a temperature below that at which it reacts with boron, preferably below 500° C., the exact temperature being dependent upon the nature of the base. Furthermore, it has been discovered that as the temperature of deposition is raised above 500° C. the boron deposit becomes increasingly crystalline, and where a completely amorphous deposit is desired the temperature should not be in excess of 500° C.

A further feature of the present invention is the control of the pressure of the boron hydride gas from which the boron deposit is formed. The pressures which may suitably be used will vary with the method employed for the formation of the boron deposit, higher pressures being permissible in the static method than in the flow method. Thus, where the hydride used is diborane, an initial pressure of 100 millimeters of mercury or less at room temperature will give a substantially pure amorphous boron deposit when the rate of heating is such that about one hour is required to reach 500° C. At higher initial pressures and more rapid rates of heating, nonvolatile hydrides are formed which can be decomposed to boron and hydrogen at an appreciable rate only by using temperatures higher than 500° C. These nonvolatile hydrides will be deposited together with the boron formed on the object to be coated and will give a deposit of poor adherence. In the flow method for the deposition of boron the best results are obtained with much lower pressures of the boron hydride gas. The pressure should not be too low, however, since under these conditions the rate of deposition becomes so slow as to be impractical. In the temperature range of 300–500° C., it has been found that satisfactory deposits of amorphous boron may be formed from diborane using pressures less than 5 millimeters of mercury, preferably in the range from 2 to 3 millimeters of mercury.

After the desired deposit has been produced on a metallic subphase, the boron coated surfaces thereof may be hardened by heating the same to a temperature greater than that at which the subphase reacts with the boron to form a boride. As above mentioned, if the article coated is a metal, such as iron, nickel, aluminum or copper, this hardening takes place at 500° C.; and reaction between the boron deposit and any metallic subphase, except the refractory metals, occurs at 700° C. If desired, the boron coating may be removed as by abrasion from any surfaces not to be hardened before the subphase is heated to its reaction temperature with boron.

In accordance with a further modification articles of amorphous boron of any convenient form may be produced by depositing boron as herein described upon a mold and then removing the mold. For example; after an amorphous boron deposit has been formed on the subphase, the latter may be dissolved by any solvent which is inert with respect to boron, thereby producing an article of solid substantially pure amorphous boron, which may be used, for example, as a neutron absorber in a neutron counter, or as a resistance element in an electrical device, such as above described. Alternatively, frangible molds or other conveniently removable molds may be used to form boron articles of any convenient form including cylinders, rods, sheets, plates, tubes, or other articles.

In a preferred embodiment of the invention, an iron or metallic cylinder may be coated with an amorphous boron deposit. In the accompanying drawings a decomposition chamber is illustrated, by way of example, as was successfully used for the coating of metal cylinders with boron by the process of this invention.

In these drawings

Fig. 1 is a longitudinal sectional view of said decomposition chamber;

Fig. 2 is a cross-sectional view taken along line 2—2 of Fig. 1; and

Fig. 3 is a cross-sectional view taken along line 3—3 of Fig. 1.

In these drawings, the reference numeral 1 designates a decomposition chamber having a lid 2 with an outlet 3; this outlet may be connected to a vacuum pump (not shown). The chamber is heated by means of an induction coil 4. An inlet pipe 5 arranged at the bottom of the chamber may be connected with a source of hydrogen (not shown) or with a container holding boron hydride, depending upon the stage of operation. The reference numeral 6 indicates a hollow metal cylinder to be coated; it is held in place by one or several bottom support elements 7 (2 in the instance illustrated) and one or several top support members 8. Prior to the coating operation the surface to be coated is thoroughly cleaned, as by machining or sandblasting and is degreased with a suitable solvent such as ethylene dichloride or carbon tetrachloride. The cylinder is then placed in a decomposition chamber and is degassed by induction heating to a dull red heat at an absolute pressure of $10^{-4}$ millimeters of mercury. The chamber is then filled with purified hydrogen to a pressure of 20 centimeters, the cylinder is reheated to a dull red heat for about 10 minutes, and gases in the chamber are pumped out while the cylinder is still hot. The latter step is repeated until no more water is formed or until the gas removed contains no appreciable content of oxygen. The cylinder is then degassed until a pressure of $10^{-4}$ millimeters is attained within the chamber at 500° C. and there maintained without further evacuation of the chamber.

After the cylinder has been cleaned and deoxidized by the above described method, the cylinder is allowed to cool and the oxygen-free chamber is filled with a gaseous hydride of boron to a total pressure of 50 millimeters. Diborane is preferred for this purpose. The cylinder is then slowly heated at such a rate that the increase in pressure is no more than 3 millimeters per minute. In one half-hour the pressure within the chamber is approximately 150 millimeters and the temperature is no more than 500° C. Further portions of diborane may be introduced as herein disclosed until the boron deposit is of any desired thickness.

After the desired deposit has been formed, excellent adherence between the iron surface and the boron may be obtained, if desired, by gradually heating the cylinder to at least 700° C. in approximately one-half hour, and maintaining that temperature for about 15 minutes. Some hydrogen is evolved during the heating and is pumped out of the decomposition chamber while the cylinder is still warm. This process may be repeated until satisfactory adherence of the deposit is obtained. It may be noted that the adherence is caused by a reaction at the interface between the boron and the cylinder whereby an extremely hard layer of iron boride is formed, said layer serving as a binder between the iron and the boron.

In another embodiment of the invention, a wire or other metal article is coated by flowing diborane or any other suitable volatile hydride of boron over the wire while heating the same to a temperature of from 300° C. to 500° C. by passing an electric current therethrough or by heating the wire by induced electric current. The wire is mounted in a chamber and is degassed by evacuating the chamber to a pressure of $10^{-5}$ millimeters of mercury while heating the wire to a very dull red heat. The wire is then preferably maintained at a maximum temperature of 500° C., and diborane is passed through the chamber in contact with the wire at a pressure of about 2 millimeters. When the desired deposit has been obtained, the wire is slowly cooled by gradually decreasing the electric current passing therethrough, in order to ensure an adherent boron coating. It may be noted that the wire may be formed of any desired metal, and the maximum temperature may be of the order of 500° C.

In still another embodiment of the invention a cylinder of substantially pure amorphous boron is produced by depositing boron on a nickel mandrel such as a wire maintained at a temperature range of from 300° C. to 500° C., and subsequently dissolving the wire with nitric acid. In this process other metals, suitable for the deposition of boron and soluble in a reagent which does not attack boron, may be substituted for nickel as, for example, silver, gold, copper, chromium, or iron; and any suitable reagent, such as aqua regia, dilute hydrochloric-nitric acid mixtures, or cyanide solutions, which will dissolve the wire without attacking boron, may be substituted for nitric acid.

In still another embodiment of the invention, a glass tube is internally coated by the following process: The surface to be coated is thoroughly cleaned with hot chromic acid solution, washed with water, and dried. The tube is then evacuated and thoroughly degassed by heating the tube with a furnace disposed therearound, until a pressure of $10^{-5}$ millimeters is obtained. A sufficient amount of diborane is then passed into the tube so that the pressure therein at room temperature is 50 millimeters. The tube is then gradually heated to 500° C. at such a rate that the final temperature is reached in one hour, at the end of which time the decomposition of the diborane is complete. This process may be repeated several times until the deposit of boron is as thick as desired. It may be noted that satisfactory neutron counters have been prepared by this method.

It will be understood that the above-described embodiments of the invention are illustrative, and many modifications thereof will be apparent to those skilled in the art without departing from the spirit of the invention or the scope of the appended claims.

What is claimed is:

1. In a process for depositing boron by thermal decomposition of a volatile hydride of boron, the step of contacting a surface with said hydride while maintaining said surface within a temperature range of from approximately 300° C. to approximately 500° C. and a maximum pressure of 150 mm. mercury whereby a deposit of amorphous boron is obtained on said surface.

2. A method of producing a boron coating on an article, comprising contacting the same with a volatile hydride of boron while maintaining said article within a temperature range sufficiently high to decompose the boron hydride but below about 500° C. whereby a deposit of amorphous boron is obtained on said article.

3. A method of producing a substantially pure amorphous boron article, comprising the steps of contacting a base with a volatile hydride of boron under a maximum sub-atmospheric pressure of 150 mm. mercury while maintaining said member at a temperature range of from 300° C. to 500° C., and then removing the base from the deposit.

4. A method of producing a substantially pure amorphous boron article, comprising the steps of contacting a base member with diborane of about 50 mm. mercury pressure in a closed system, heating said member to a temperature greater than 300° C. and lower than 500° C. while maintaining the pressure below 150 mm. mercury, said temperature being lower than that at which said member reacts with boron, and then removing said member from the deposit.

5. A method of producing a substantially pure amorphous boron article, comprising the steps of depositing a layer of said boron on a base member by contacting the same with a volatile hydride of boron in a continuous stream at a pressure of about 2 mm. mercury while heating said member to a temperature within a temperature range of from 300° C. to 500° C., said temperature being lower than that at which boron reacts with said member, and then removing said member from the deposit.

HERMANN I. SCHLESINGER.
GEORGE W. SCHAEFFER.

REFERENCES CITED

The following references are of record in the file of this patent:

UNITED STATES PATENTS

| Number | Name | Date |
| --- | --- | --- |
| 1,774,410 | Van Arkel | Aug. 26, 1930 |
| 1,855,562 | Swinne | Apr. 26, 1932 |
| 1,876,229 | Herzog et al. | Sept. 6, 1932 |
| 2,307,005 | Ruben | Dec. 29, 1942 |
| 2,415,946 | Goss | Feb. 18, 1947 |

FOREIGN PATENTS

| Number | Country | Date |
| --- | --- | --- |
| 245,753 | Great Britain | Jan. 27, 1927 |

OTHER REFERENCES

Thorpe's Dictionary of Applied Chemistry, fourth edition, vol. II (1938), pages 41 and 42, Longmans, Green & Co., N. Y.

H. I. Schlesinger, G. W. Schaeffer, and G. D. Barbaras, "Deposition of Pure Boron, I," U. S. Atomic Energy Commission, MDDC, 1338, 26 pages, Oak Ridge, Tennessee.

H. I. Schlesinger, G. W. Schaeffer, G. D. Barbaras, and T. Wartik, "Deposition of Pure Boron, II," U. S. Atomic Energy Commission, MDDC, 1339, 16 pages, Oak Ridge, Tennessee.